US006192128B1

(12) United States Patent
Myers et al.

(10) Patent No.: US 6,192,128 B1
(45) Date of Patent: Feb. 20, 2001

(54) CURRENT-SENSITIVE TELEPHONE-LINE DISCONNECT SYSTEM

(75) Inventors: Edwin C. Myers; Theodore J. Rauen, both of Washington, DC (US)

(73) Assignee: The United States of America as represented by the Secretary of the Navy, Washington, DC (US)

(*) Notice: Under 35 U.S.C. 154(b), the term of this patent shall be extended for 0 days.

(21) Appl. No.: 04/532,529

(22) Filed: Feb. 28, 1966

(51) Int. Cl.[7] ........................................ H04K 1/00

(52) U.S. Cl. ............................ 380/257; 380/52; 380/59

(58) Field of Search .................................. 179/1 SW, 1.5, 179/19, 38; 713/200; 380/252, 253, 254, 255, 257, 41, 287, 52, 59, 38, 259, 275; 455/116

(56) References Cited

U.S. PATENT DOCUMENTS 3,123,672 * 3/1964 Ross ....................................... 380/275

* cited by examiner

*Primary Examiner*—Bernarr E. Gregory
(74) *Attorney, Agent, or Firm*—Barry A. Edelberg; Charles J. Stockstill

(57) ABSTRACT

The circuit uses a current sensing device that is controlled by the telephone line current. The telephone lines are connected to the contacts of a push-button switch, and a diode bridge is connected across contacts of the switch. Further, the circuit has a DC slow-release relay that is located across the output of the diode bridge. The telephone lines are also connected to the relay contacts of the DC slow release relay. A capacitor is placed across the telephone lines, and another capacitor is placed between the diode bridge and one of the relay contacts of the DC slow-release relay. The two capacitors act to shunt any radio frequencies that occur in the circuit as a result of an attempt to obtain information by RF saturation techniques.

14 Claims, 2 Drawing Sheets

CURRENT-SENSITIVE TELEPHONE-LINE DISCONNECT SYSTEM

The present invention relates generally to improvements in telephone line disconnects and the like, and more particularly to new and improved current-sensitive telephone-line disconnects wherein the disconnect operates to close the telephone lines by means of the telephone line current during a call, and wherein the disconnect automatically operates to break all telephone connections between the incoming lines and the telephone when the handset is cradled and the line current drops to zero, so as to prevent the use of the cradled telephone for clandestine listening techniques.

In the field of telephone-line disconnects it has been the general practice to employ mechanical-type disconnects, such as a plug and jack, to break all telephone connections. Although such devices have served the purpose they have not proved entirely satisfactory under all conditions of service for the reasons that they rely on the user and require him to manually connect the lines prior to each phone call and then to disconnect all lines after each call is completed. This necessity for manual disconnection of the telephone lines is particularly bothersome and time-consuming when the telephone includes a plurality of lines for auxiliary purposes in addition to the voice lines, and where a large number of plugs and jacks are involved.

The general purpose of this invention is to provide a telephone-line disconnect which embraces all of the advantages of similarly employed devices and which possesses none of the aforedescribed advantages. The present invention provides automatic protection against the use of cradled telephones as clandestine listening devices by protecting against such techniques as radio-frequency saturation, audio pickup and hidden transmitters which use the telephone set as a source of power. Several embodiments of single and multi-line disconnects are included in this invention in order to meet various operational requirements such as, for example, variations in available telephone line currents in different countries.

Each embodiment of this invention uses the same basic principles of operation and provides the best possible semi-automatic or automatic isolation between the cradled telephone and all outside wiring by using circuit-breaking devices, such as relay contacts, to break the connections. When the telephone is not in operation, open relay contacts automatically and completely disconnect the telephone from all incoming lines. Means are provided to operate the relays and close the contacts when the telephone is to be used. Upon completion of a call, the handset is cradled and the line current drops to zero which automatically disconnects all wiring to the telephone, thus precluding the necessity of the user disconnecting the multiplicity of lines after each call. In this way the successful operation of the disconnect is not dependent upon the user and is not subject to compromise by personnel error, are mechanical disconnects.

An object of the present invention is the provision of a telephone-line disconnect system which will protect against the use of cradled telephones as cladestine listening devices.

Another object is to provide a telephone-line disconnect system which will provide protection against such listening techniques as radio-frequency saturation, audio pickup and the use of hidden transmitters which use the cradled telephone as a source of power.

A further object of the invention is the provision of the above-mentioned disconnect system wherein the telephone line current is used to control the opening or closing of all the telephone lines.

Still another object is to provide a telephone-line disconnect system which automatically disconnects all telephone lines when the telephone is cradled and is not in use.

Yet another object of the present invention is the provision of the above-mentioned disconnect system which will be capable of operation for a wide range of telephone line currents.

A still further object of this invention is to provide a telephone disconnect system which is not solely dependent on the user for its operation and which is not subject to compromise because of personnel error.

With these and other objects in view, as will hereinafter more fully appear, and which will be more particularly pointed out in the appended claims, reference is now made to the following description taken in connection with the accompanying drawings in which:

DETAILED DESCRIPTION OF THE INVENTION

Figure 1:
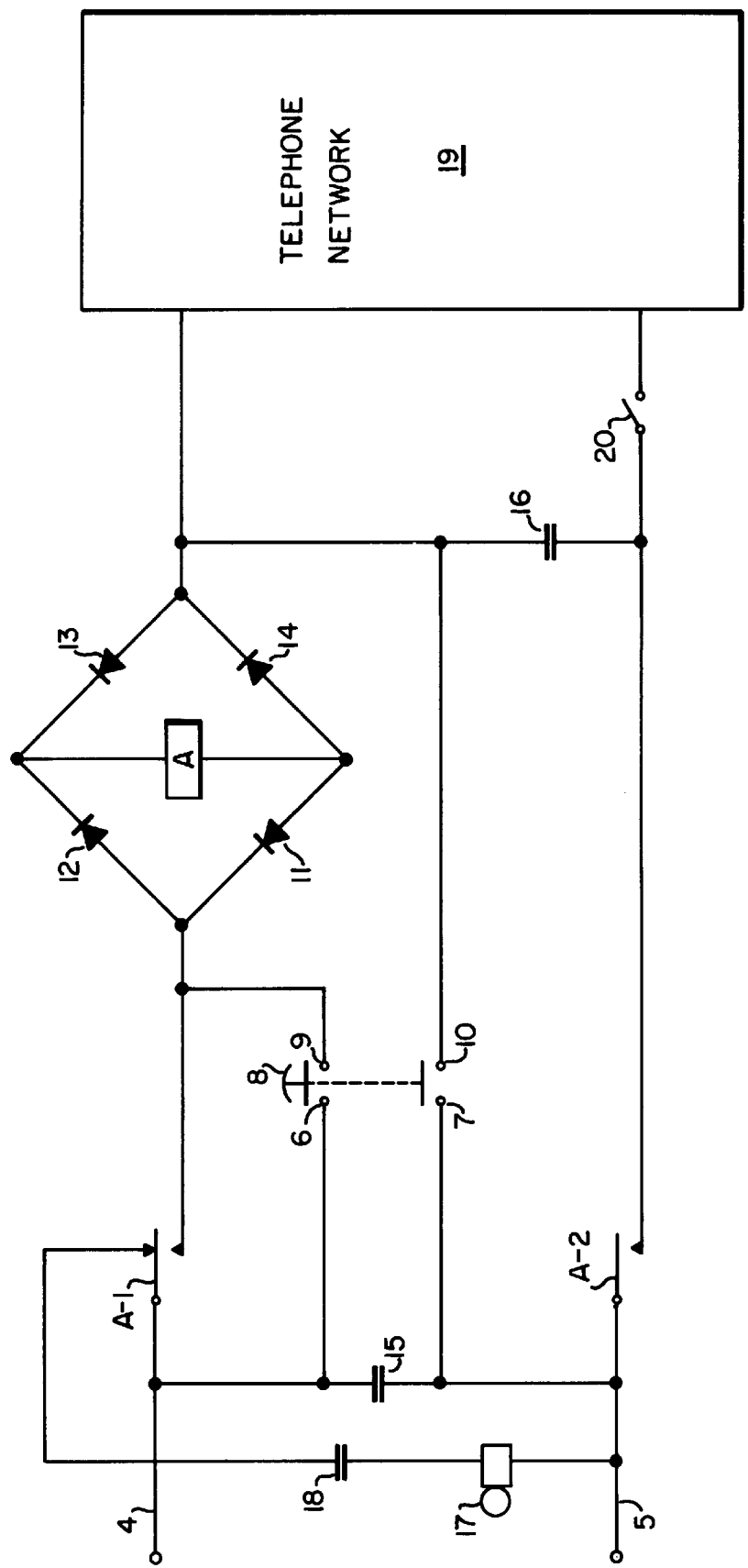
FIG. 1 shows a schematic view of a single-line, semi-automatic disconnect system.

Referring now to the drawings, there is shown in FIG. 1 a circuit which embraces the basic principle of the present invention, e.g. the opening and closing of telephone lines by current-sensing means, such as a relay, which is controlled by the telephone lines current. The telephone lines 4 and 5 are connected to contacts 6 and 7 of push-button switch 8, and a diode bridge comprised of diodes 11–14 is located across contacts 9 and 10 of the switch 8. In addition, a D.C. slow-release relay A is located across the output of the diode bridge. The telephone lines 4 and 5 also are connected to the relay contacts A-1 and A-2, respectively, of D.C. slow-release relay A.

Located across the lines 4 and 5 is capacitor 15 and between the diode bridge and relay contact A-2 is capacitor 16, both of which capacitors are for the purpose of shunting any radio frequencies which may occur in the circuit as a result of an attempt to obtain information from the cradled telephone by means of radio-frequency saturation techniques.

In addition to the capacitor 15, a non-resonant type ringer 17 and capacitor 18, which are in series with respect to each other, are connected between lines 4 and 5 in such a way that when the relay A is inactivated and, therefore, when relay contact A-1 is also inactivated a closed A.C. circuit exists from line 4, through capacitor 18 and ringer 17 to line 5, thus permitting the ringer to sound when subjected to the A.C. current component which occurs when an incoming call is received. The telephone network 19 and the telephone cradle. switch 20, both of which are located within a standard telephone housing (not shown), are series connected with respect to one another and both in turn, are connected in parallel with capacitor 16, which is located between the diode bridge and relay contact A-2.

In the operation of this single-line, semi-automatic disconnect the normally open contacts of pushbutton switch 8 bypass the normally open relay contacts A-1 and A-2 of relay A. The momentary closing of the pushbutton switch 8 by the telephone user, coupled with the closing of the cradle switch 20 which occurs when the telephone handset is uncradled, causes direct current from lines 4 and 5 to flow through the diode bridge and the D.C. relay A, which current operates the relay and closes relay contacts A-1 and A-2. Upon release of switch 8 line current continues to flow through the closed relay contacts A-1 and A-2, into the diode bridge through the relay, and through the telephone network 19. The relay A must be a D.C. slow-release relay in order to prevent the relay contacts A-1 and A-2 from opening during the brief interruption of D.C. line current through the telephone network 19 when the telephone is being dialed.

When the party at the other end of the lines 4 and 5 answers his telephone the D.C. line current polarity reverses, but the diode bridge allows this direct current to always flow in the same direction through the D.C. relay A in order to keep the relay contacts A-1 and A-2 closed for the duration of the telephone call.

In the event that a call is originated at the other ends of lines 4 and 5, alternating current which is super-imposed on direct current flows through these lines, through capacitor 18 and the ringer 17, which is activated and rings to indicate that there is an incoming call.

When the telephone user uncradles the handset to answer the call, the telephone cradle switch 20 is automatically closed. Then the user must push the switch 8 in order to activate the relay A which, in turn, closes the relay contacts A-1 and A-2, thus preventing further current flow through the ringer 17, and allowing activation of the network 19. This bell portion of the circuit is well known in the prior art as is its operation, and its use is intended in all the embodiments of this invention, although it is only described herein with respect to the embodiment of FIG. 1.

Figure 2:
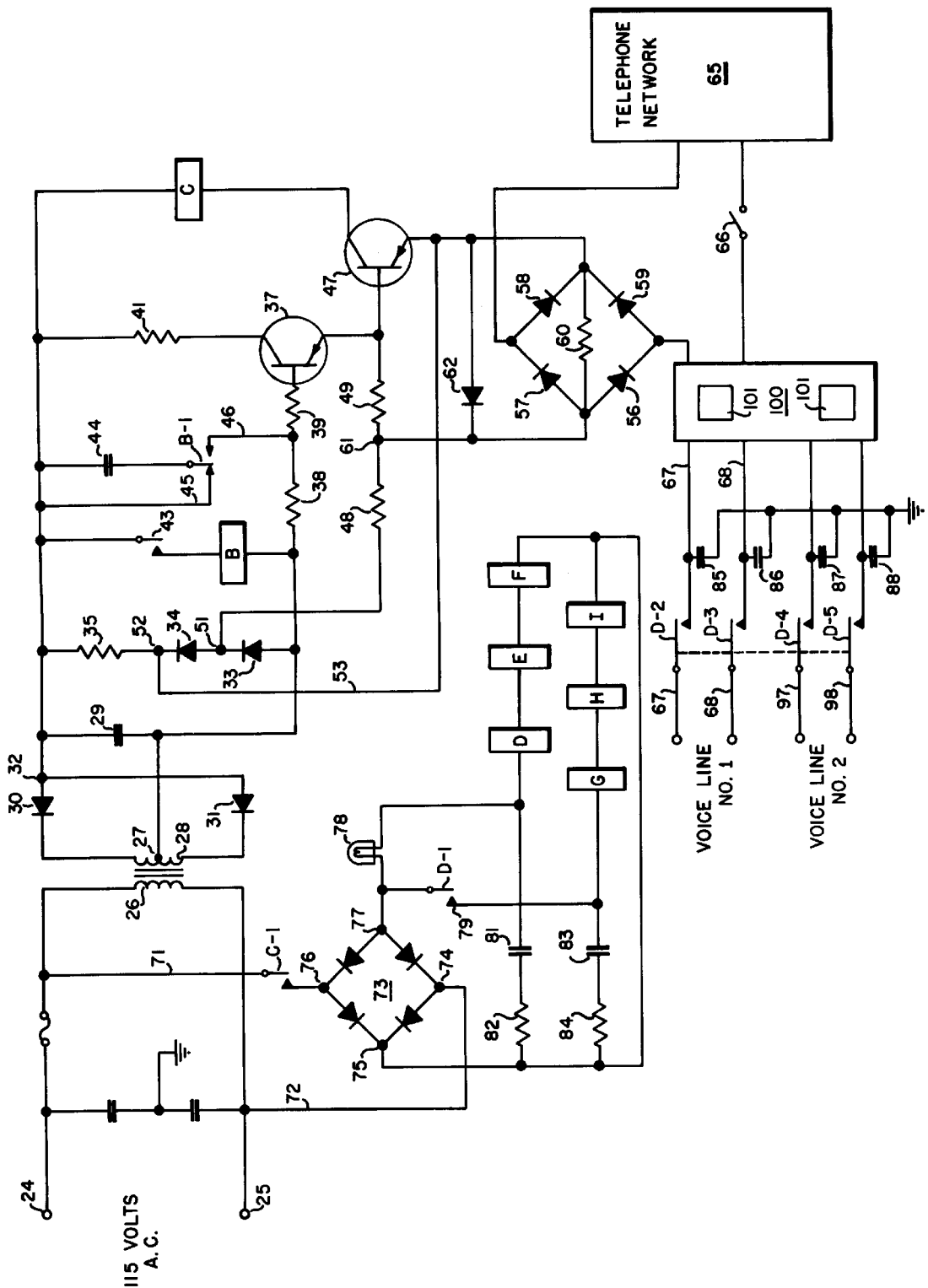
FIG. 2 illustrates a multiline telephone disconnect system which may be operated in either a semi-automatic or an automatic mode.

Within reference to FIG. 2 there is shown a circuit which provides a multi-line telephone disconnect capable of breaking 144 single telephone conductors and which includes amplification means for amplifying the telephone line current when it is insufficient to operate the necessary relays.

Referring now in detail to FIG. 2, there is shown a standard 115 volt A.C. power source which supplies power to lines 24 and 25 and, in turn, to the primary winding 26 of a transformer. A center tap 27 of the secondary winding 28 of the transformer is connected to one side of smoothing capacitor 29. The cathode sides of diodes 30 and 31 terminate at the top and bottom, respectively, of the transformer secondary winding 28, and the anode sides of the diodes 30 and 31 are connected to a common terminal on the top side of smoothing capacitor 29. The diodes 30 and 31, the center tap 27 of secondary winding 28 and the smoothing capacitor 29 form a full-wave rectifier circuit which provides a D.C. voltage across the smoothing capacitor 29 wherein the bottom terminal of the capacitor is more positive than its top terminal.

Biasing diodes 33 and 34 and resistor 35 are associated in series with respect to each other so that the anode of diode 34 is connected to the cathode of diode 33 and the cathode of diode 34 is common to one end of the resistor 35. The other end of resistor 35 is connected to the top terminal of capacitor 29 and the anode of diode 33 is common to the bottom terminal of capacitor 29.

The base of transistor 37 is connected to the bottom of smoothing capacitor 29 by current-limiting resistors 38 and 39 which are in series with respect to each other, and the collector of the transistor 37 is in series with the current-limiting resistor 41, which in turn, has a terminal in common with the upper terminal of smoothing capacitor 29.

Located between resistor 38 and diode 33 is one terminal of D.C. relay B, and in common with the upper terminal of capacitor 29 is switch 43 which is normally disconnected from the second terminal of relay B. The switch 43 can be either a pushbutton switch, which requires the telephone user to momentarily close it upon operation of the telephone so as to contact the upper terminal of relay B, or the switch 43 can be comprised of a separate set of contacts within the switch 66 and arranged so as to automatically contact the upper terminal of relay B upon lifting of the telephone handset, and closing of cradle switch 66.

One terminal of capacitor 44 is common to the upper terminal of smoothing capacitor 29 while the other side of the capacitor 44 is connected to relay contact B-1 of the D.C. relay B. When the relay B is not activated the relay contact B-1 is in electrical contact with the line 45 which shorts the capacitor 44, thus keeping it in a discharged state, but when the relay B is activated, the relay contact B-1 is disconnected form the line 45 and comes into contact with terminal 46, which is located between resistors 38 and 39.

The base of transistor 47 is common with the emitter of transistor 37, both of which are connected by current-limiting resistors 48 and 49 to a terminal 51 located between diodes 33 and 34. The emitter of transistor 47 is made electrically common with a point 52, located between resistor 35 and diode 34, by line 53, and the collector of transistor 47 is connected to the top terminal of capacitor 29 by means of D.C. slow-release relay C.

A first diode bridge circuit comprised of diodes 56–59 and resistor 60 is located across the base and emitter of transistor 47 in such a way that the cathodes of diodes 58 and 59 are common to the emitter and the anodes of diodes 56 and 57 are common to a point 61 located between resistors 48 and 49. In addition a current-limiting means, such as diode 62, is oriented across the transistor and the bridge circuit, and is located with the anode connected to the emitter of transistor 47 and the cathode connected to the point 61 between resistors 48 and 49. This diode 62 and resistor 49 limit the amount of telephone line current which will flow through the transistor 47 for various values of telephone line current.

The telephone network 65, the cradle switch 66 and the voice line pick-up keyboard 100 are connected in series with respect to each other and with respect to the diode bridge and the telephone lines 67 and 68, which comprise one pair of the plurality of voice-transmission lines associated with the network 65.

The line pick-up keys 101 selectively determine which pair of telephone voice lines are series-connected to the telephone network 65. Two line pick-up keys 101 are shown in FIG. 2 by way of example, but it is to be understood that any number of keys may be used depending upon the number of voice lines which are associated with the network 65.

Tapped off of lines 24 and 25 are lines 71 and 72, respectively, wherein the line 72 is connected to one terminal 74 of diode-bridge rectifier 73 and wherein line 71 is connected to relay contact C-1 of the slow-release relay C, which contact touches terminal 76 of the diode bridge whenever the relay C is activated.

Located between the terminals 75 and 77 of diode bridge 73, and connected in series with respect to each other, are D.C. relays D, E and F, each with a plurality of contacts, e.g. twenty four, and warning means 78, e.g. a lamp. Between the diode bridge terminal 77 and warning lamp 78 is located relay contact D-1 which, when relay D is activated, closes onto terminal 79. The terminal 79 when connected to the relay contact D-1 forms a series circuit between the diode bridge terminals 75 and 77, which circuit comprises D.C. relays G, H and I each with a plurality of contacts, e.g.

twenty four. Arc-suppressing means consisting of capacitor 81 and resistor 82, which are series-connected with respect to each other, and capacitor 83 and resistor 84, which are also series-connected with respect to each other, are located in parallel, across relays D, E and F and across relays G, H and I, respectively.

As shown in FIG. 2, by way of example, the relay contacts D-2, D-3, D-4 and D-5 are closed when relay D is activated, as are similar contacts on relays E, F, G, H and I when they are activated. These relay contacts (not shown) associated with all of the relays D, E, F, G, H and I are similarly closed upon activation of their respective relays in order to close other voice, lamp and auxiliary circuits to the telephone which circuits are not shown in the figure. In addition the capacitors 85–88 are connected between each of the telephone lines 67, 68, 97 and 98, respectively, and ground so as to provide protection against the use of the telephone as a clandestine listening device by techniques such as radio-frequency saturation. Capacitors (not shown) are similarly connected with respect to all other telephone lines which may be present.

It is to be understood that any number of relays could be used and that relays D, E, F, G, H and I are merely shown as examples of the number of relays that could be used. The number will depend upon the number of lines associated with each individual telephone unit.

In the operation of this multi-line disconnect with amplification means, a D.C. voltage is provided across smoothing capacitor 29 by means of the full-wave reactifier comprised of diodes 30 and 31, the transformer secondary 28 and center tap 27. Diodes 33 and 34 and resistor 35 act to bias transistors 37 and 47 in an off condition.

When it is desired to operate the telephone, the user must momentarily close the switch 43 manually, by pushbotton for example, or if the switch comprises separate contacts of switch 66 it can be arranged so as to automatically close upon lifting of the telephone handset and closing of the cradle switch 66. The closing of the switch 43 activates D.C. relay B which, in turn, causes relay contact B-1 to contact terminal 46, thus causing the capacitor 44 to be charged through resistor 38. The transient resulting from the charging of capacitor 44 momentarily turns on transistor 37 which remains on only for the duration of the transient, i.e. until capacitor 44 is fully charged.

As a result of transistor 37 being turned to an on condition, transistor 47 is also turned on, thus activating D.C. slow-release relay C which closes relay contact C-1 onto the terminal 76 of diode-bridge rectifier 73. As a result, A.C. line current from the lines 24 and 25 is admitted through the bridge rectifier 73. The direct current output from the rectifier 73 initially activates the D.C. relays D, E and F and the warning lamp 78. The activation of relay D closes relay contact D-1 onto the terminal 79, thus allowing the current output of rectifier 73 to activate D.C. relays G, H and I. In addition, the activation of relays D, E and F followed by the activation of relays G, H and I, closes relay contacts D-2, D-3, D-4 and D-5 and there remaining relay contacts (not shown) which are associated wit relays D, E, F, G, H and I. This closing of relay contacts connects all lines into the telephone, including the voice lines, e.g. 67 and 68 which are activated by their respective selection button 101.

Voice-line current then flows through lines 67 and 68 and into the diode-bridge formed by diodes 56–59 and resistor 60. Part of this line current flows through the base-emitter circuit of transistor 47 and the remainder flows through diode 62.

The base-emitter current through resistor 49 keeps transistor 47 turned on which, in turn, maintains relay C in an activated condition. The transistor 47 remains biased on as long as current flows through the resistor 60, thus keeping relay c in an activated state.

The diode-bridge comprised of diodes 56–59 and resistor 60 is necessary in order to maintain current through resistor 60 in only one direction, and in order to keep transistor 47 biased on during operation of the telephone, because a change in direction of direct current flow occurs in voice lines 67 and 68 when the party being called answers his telephone. In addition the warning lamp 78 is located in the circuit in such a manner that if the lamp burns out, the disconnect operates to open all the telephone lines because there is no current flow through relays D, E, F, G, H and I. Thus, whenever the lamp is on the telephone user is placed on notice that the lines to the telephone are all closed and that it is possible to obtain information from these telephone lines.

In this multiline disconnect the relay C must be a slow-release D.C. relay so as to prevent disconnecting of relay contact C-1 during interruption in the telephone line current which occur as a result of the dialing of the telephone.

The circuitry of the disconnects of both FIG. 1 and FIG. 2 must be provided with physical security in order to prevent a compromise of the systems. Because of the simplicity of the disconnect in FIG. 1 a sealed throw-away package is used to provide security. But, because of the complexity of the multiline unit of FIG. 2 a small steel cabinet incorporating a combination safe-type lock on the cover may be used to provide the physical security desired for the unit and still permit access for maintenance. With respect to the multiline unit of FIG. 2, however, the switch 43 may not be provided physical security, because it is often located on the telephone itself, but a short circuit across the switch 43, as a result of tampering for example, will not allow operation of the disconnect circuit so as to close the telephone lines, unless the cradle switch is also closed by keeping the headset uncradled. Thus, it is impossible to compromise the system by shorting the switch 43, which is the only element of the disconnect that is not provided physical security. This is true as the headset is cradled and cradle switch 66 is open. So information cannot be obtained from the cradled telephone even if switch 43 is shorted.

Were the switch 43 to be shorted, the relay B would be continuously activated and relay contact B-1 would be closed, thus causing the transient charging of capacitor 44 until the capacitor was fully charged. This transient would bias on transistor 37 which, in turn, would bias on transistor 47. As a result the relay C would be activated which would close relay contact C-1 and which would momentarily result in the closing of all the relay contacts, e.g. D-1, D-2 etc., of the telephone lines. But after capacitor 44 is completely charged the transistor 37 is biased off, and transistor 47 is also biased off, because there is no line current flowing through resistor 60, as a result of cradle switch 66 being open when the telephone is cradled.

This invention provides a telephone disconnect which may be either semi-automatic or automatic in operation and which utilizes telephone line current. One embodiment of this invention is triggered to operate by the transient charging of a capacitor, and amplification means allows the use of the disconnect even where the unamplified telephone line current is insufficient to operate the relays of the system. This telephone disconnect protects against the use of cradled telephones as clandestine listening devices by protecting against listening techniques such as radio-frequency saturation, audio pickup and the use of hidden transmitters which use cradled telephones as sources of power. In addition this invention provides security for cradled telephones in a way that is not dependent on the user for the disconnects successful operation and therefore, the security of the cradled telephone is not subject to compromise because of personnel error.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A telephone disconnect system which operates to prevent the use of a cradled telephone as a clandestine listening device, comprising:

a telephone network;

electrical lines, series-connected with respect to said network and with respect to one another;

a cradle switch operable to be closed so as to be series-connected with respect to said network and said lines;

normally disabled current-sensing means maintaining said lines and said network in open circuit relationship; and switching means operable upon closure of said cradle switch to activate said current-sensing means and said network, thereby permitting electrical energy to flow through said electrical lines and said network.

2. The disconnect system of claim 1, including:

a diode bridge which is series-connected with respect to said network and said lines, and wherein said current-sensing means is operatively located across said diode-bridge to allow direct current flow through said current-sensing means in one direction only.

3. The telephone disconnect system of claim 2, wherein said current-sensing means comprises a slow-release, direct-current relay.

4. The telephone disconnect system of claim 3 wherein said relay includes; a plurality of relay contacts located one each in series with respect to each of said electrical lines, whereby said relay contacts open and close said electrical lines when said relay is inactivated and activated, respectively.

5. The disconnect system of claim 1 including radio-frequency shunting means operatively located in parallel with respect to said network, thereby preventing the use of radio-frequency saturation techniques to obtain information from said network.

6. A multiline telephone disconnect system which operates to prevent the use of a cradled telephone as a clandestine listening device, and which is capable of operating over a wide range of telephone line currents, comprising:

a telephone network, a plurality of pairs of electrical lines selectively operatively coupled with respect to said network and wherein at least one of said pairs comprises voice transmission lines, a cradle switch operable to be closed so as to be series-connected with respect to said network and with respect to said voice-transmission lines, a normally disabled first current-sensing means maintaining said network and said voice-transmission lines in open circuit relationship.

amplification means operatively coupled to said first current-sensing means, and switching means operable upon closure of said cradle switch to trigger said amplifciation means on by a transient, whereby said first current-sensing means, when energized and when said cradle switch is closed, operates to allow electrical energy to flow through said plurality of pairs of electrical lines, and whereby said first current-sensing means, when de-energized, operates to open said plurality of pairs of electrical lines.

7. The multiline telephone disconnect system of claim 6, including;

a plurality of second current-sensing means operatively associated with said first current-sensing means, whereby said second current-sensing means physically open and close said plurality of pairs of electrical lines when they are energized and de-energized, respectively.

8. The multiline disconnect system of claim 7, including;

warning means operatively coupled with respect to said plurality of second current-sensing means to prevent operation of said plurality of second current-sensing means when said warning means is inoperable.

9. The disconnect system of claim 7 wherein said plurality of second current-sensing means comprise direct current relays.

10. The multipline disconnect system of claim 6 wherein said first current-sensing means, comprises a slow-release, direct-current relay.

11. The multiline telephone disconnect system of claim 6, including;

a diode bridge series-connected with respect to said voice transmission lines, and operatively coupled with respect to said first current-sensing means to allow direct current flow through said first current-sensing means in one direction only.

12. The disconnect system of claim 6 including current-limiting means operatively associated with said amplification means to limit the maximum current flow through said amplification means.

13. The disconnect system of claim 6 including resistive and capacitive means operatively coupled to said amplification means and to said switching means, whereby the activation of said switching means permits the transient charging of said capacitive means through said resistive means so as to trigger said amplification means to an on condition.

14. The disconnect system of claim 6 including radio-frequency shunting means operatively coupled to said plurality of pairs of electrical lines and to said telephone network, thereby preventing the use of radio-frequency saturation techniques to obtain information from said telephone network.

* * * * *